INVENTORS
DANIEL RHEE and
DONALD COCKBURN
BY Burns, Doane & Benedict
ATTORNEYS

INVENTORS
DANIEL RHEE and
DONALD COCKBURN

BY *Burns, Doane & Benedict*
ATTORNEYS

May 1, 1956 D. RHEE ET AL 2,743,479
APPARATUS FOR VULCANIZING RUBBER MATERIAL
Filed April 9, 1953 4 Sheets-Sheet 3

INVENTORS
DANIEL RHEE and
DONALD COCKBURN

BY Burns, Doane & Benedict

ATTORNEYS

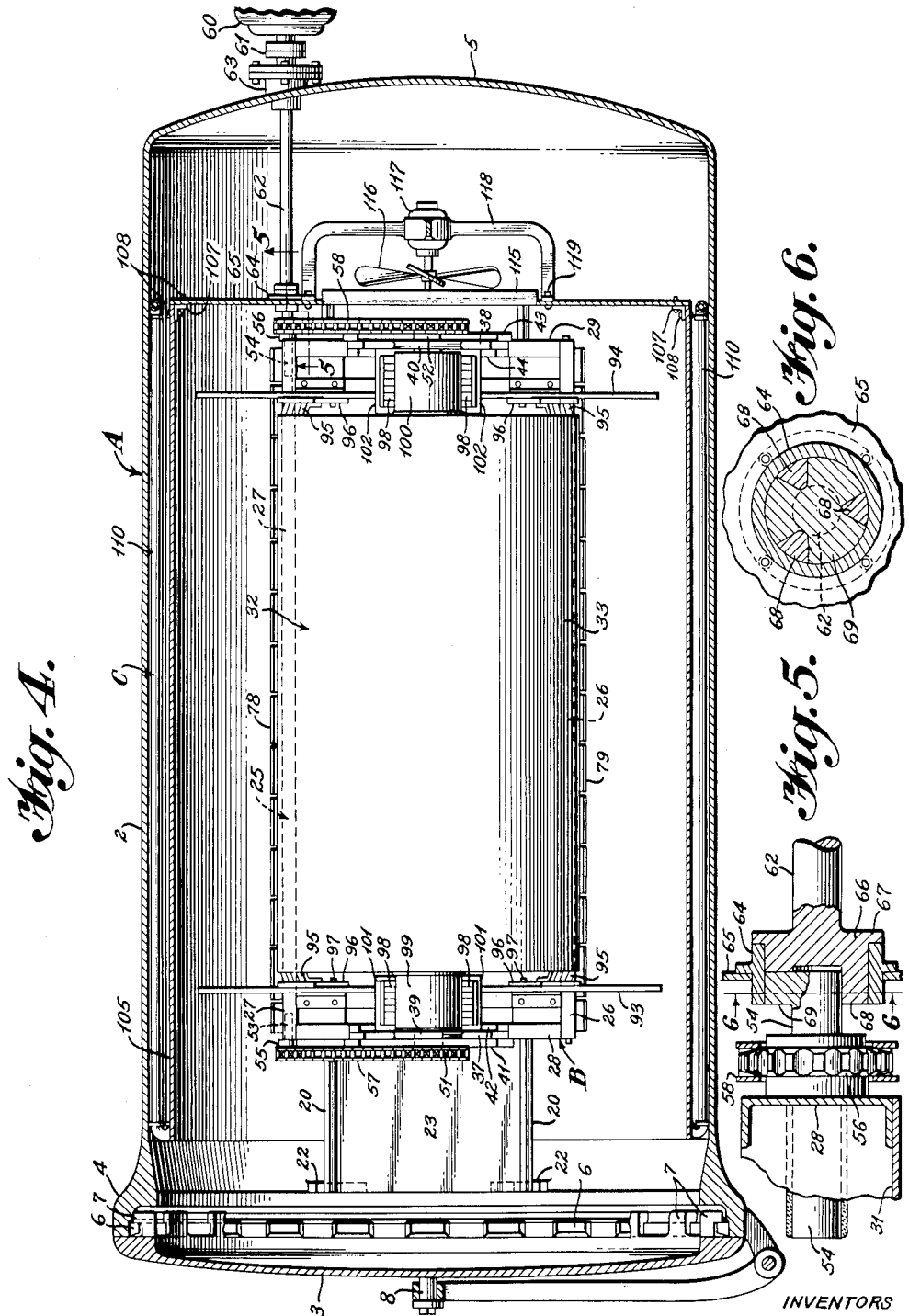

United States Patent Office 2,743,479
Patented May 1, 1956

2,743,479

APPARATUS FOR VULCANIZING RUBBER MATERIAL

Daniel Rhee, Rehoboth, Mass., and Donald Cockburn, Warren, R. I., assignors to Rhee Elastic Thread Corporation, Warren, R. I., a corporation of Rhode Island Application April 9, 1953, Serial No. 347,731

7 Claims. (Cl. 18—6)

This invention relates generally to an apparatus for vulcanizing rubber. More specifically, the invention described herein relates to an apparatus for vulcanizing sheet rubber suitable for use in the manufacture of rubber thread.

Vulcanized rubber thread is utilized in the manufacture of women's foundation garments, elastic hosiery, golf balls, and the like to provide elasticity. Thread suitable for these articles desirably possesses throughout its length, uniformity of color and elasticity. In general, to produce such rubber threads, a thin sheet of vulcanized rubber is slit longitudinally. In order that the thread will have uniform elastic characteristics and color, the rubber sheet from which the thread is cut must likewise be uniform.

In producing unvulcanized rubber sheets, a mass of raw rubber containing the vulcanizing agents is fed through a calendering machine which, by means of a plurality of rollers, spreads the mass into an unvulcanized sheet of the desired dimensions. The calendered unvulcanized rubber sheet so produced is characterized by "calendering defects," such as rough surfaces and friction holes. These defects should be removed from the calendered rubber sheet in the vulcanizing operation to provide a uniform vulcanized rubber sheet requisite for the production of rubber thread.

In the prior structure used for vulcanizing sheet rubber it has been impossible or impractical to remove all of the calendering defects from the calendered sheet rubber and accordingly the vulcanized sheet rubber product lacks the required uniformity necessary to produce a rubber thread having uniform characteristics. The production, in prior structures, of imperfect vulcanized rubber sheets has necessitated the discarding of those portions of the rubber sheet which contain the calendering defects or are of nonuniform color.

Furthermore, the existing sheet rubber vulcanizing machines are unsuitable for the vulcanization of extensive lengths of rubber sheet. This limitation inherent in existing machines, is created by the method of heating the sheet rubber to produce the vulcanization. In order to produce a uniformly vulcanized sheet, every point on the rubber sheet should be heated to the proper vulcanizing temperature and maintained at that temperature for a specific length of time. With prior structures, attempts to vulcanize extensive lengths of rubber sheet resulted in portions of the rubber sheet being overheated, whereas other portions failed to receive sufficient heat. The end result was a vulcanized rubber sheet which lacked the required uniformity of vulcanization for producing suitable rubber thread.

Even with shorter lengths of rubber sheet, it has been impossible to obtain uniform vulcanization thereof with prior art apparatus. Such prior art apparatus is incapable of producing uniform temperature conditions of the sheet rubber of any substantial length during the vulcanization thereof. In prior art apparatus the edges of the rubber sheet and the outer portions thereof become overheated, burned and discolored. Lack of color uniformity in rubber thread is an objectionable defect. Accordingly, vulcanized rubber sheets produced on existing structures had to be trimmed to remove the discolored or burned portions of the vulcanized sheets. Such a waste of the vulcanized rubber sheets adds to the expense and lowers the efficiency of production of rubber thread.

Accordingly, it is a principal object of this invention to provide an improved rubber vulcanizing apparatus which will overcome the disadvantages noted above which are inherent in existing vulcanizing structures.

A further object of this invention is to provide a rubber vulcanizing apparatus wherein a rubber sheet of great length, for example lengths in excess of 1500 yards, may be vulcanized with the product having uniform elastic and color characteristics.

Another object of this invention is to provide a vulcanizing apparatus wherein uniform temperature conditions may be maintained in the rubber being vulcanized during the vulcanization thereof.

A more specific object of this invention is to provide a rubber vulcanizing apparatus incorporating a dual heating means whereby the rubber may be quickly raised to the vulcanizing temperature and a uniform vulcanizing temperature may be maintained in the rubber during the vulcanization period.

A still further object of this invention is to provide an autoclave structure incorporating steam heating means and high frequency dielectric heating means for uniformly curing the rubber in the structure.

A further object of this invention is to provide a sheet rubber supporting carriage whereby the sheet rubber may be moved into an autoclave and moved while positioned therein to assist in uniform heating of the rubber during the vulcanization thereof.

Another object of this invention is to provide an autoclave with dual heating means for externally and internally heating the rubber being vulcanized, and a carriage for supporting the rubber to be vulcanized in said autoclave.

For the accomplishment of the foregoing and related objects, this invention comprises the means hereinafter fully described and particularly pointed out in the claims. The annexed drawings and the following description sets forth in detail a certain structure embodying the invention; such structure, however, is but one of various mechanical forms in which the principle of this invention may be used.

Referring to the drawings:

Figure 4 is a horizontal sectional view taken on line 4—4 of Figure 2.

Figure 5 is a detailed sectional view taken on line 5—5 of Figure 4.

Figure 6 is a detailed sectional view taken on line 6—6 of Figure 5.

Figure 1:
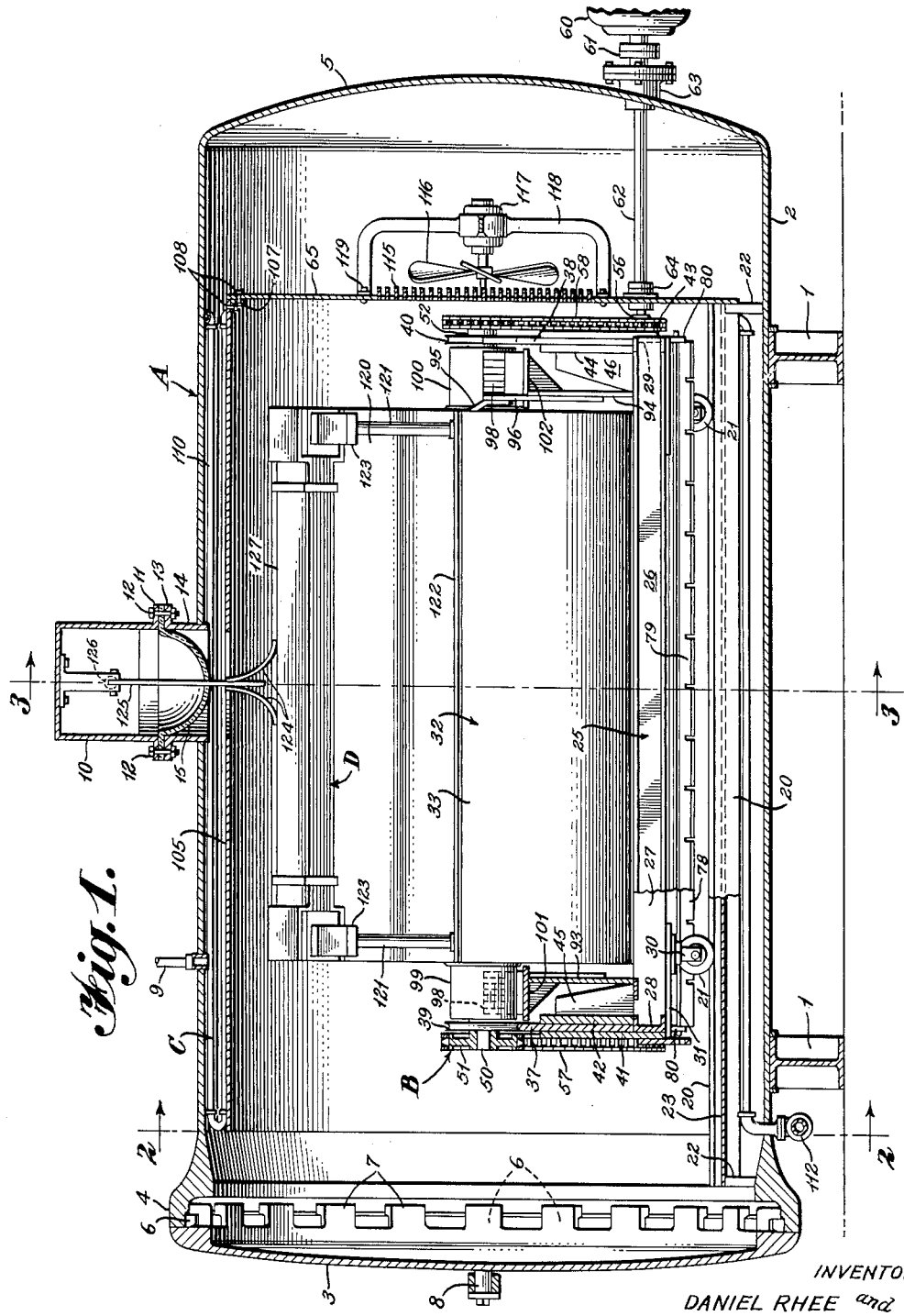
Figure 1 is a longitudinal vertical sectional view of an improved rubber vulcanizing apparatus in which the method of this invention may be practiced.

Referring to Figure 1, wherein the over-all rubber vulcanizing apparatus is illustrated, an autoclave A is shown with a load-supporting carriage B positioned therein. The carriage B is constructed to be moved into and out of the autoclave A on suitable tracks provided therefor, and to support thereon a load of sheet rubber to be vulcanized in the autoclave, as will be described subsequently.

Steam heating means, indicated generally at C, and high frequency dielectric heating means, indicated generally at D, are utilized in combination to effect in the manner hereinafter described the heating and vulcanization of the rubber supported by the carriage B. The specific details of steam heating means C and high frequency dielectric heating means D are described hereinafter.

The operation of the specific embodiment described herein will become apparent from the particular description of the parts thereof which follows. Suffice it to state at this point that the general operation of the apparatus for vulcanizing sheet rubber is as follows:

The carriage B supports the sheet rubber to be vulcanized in the form of a roll. This roll, as will be described subsequently, has a cross-section of alternate layers of the uncured sheet rubber and a separating and supporting sheet dielectric material different from the uncured rubber. The carriage B is rolled into position in the autoclave A, so that the roll of sheet rubber may be externally heated by the steam heating means C which maintains the temperature of the atmosphere within the autoclave at the vulcanizing temperature. In addition, the sheet rubber roll on the carriage B is so positioned in the autoclave A when the carriage is wheeled thereinto, as to be subjected to internal heating created by the high frequency dielectric heating means D. Thus, in the apparatus of this invention, the rubber is vulcanized by internally raising the temperature thereof by means of the high frequency dielectric heating means D while at the same time the surrounding atmosphere within the autoclave A is heated to the vulcanizing temperature by the steam heating means C. After the rubber has reached the particular vulcanizing temperature, the internal heating by the high frequency dielectric heating means is discontinued and the temperature of the rubber is maintained constant at the vulcanizing temperature by the steam heating means C, for a period of time necessary to properly vulcanize the rubber.

Reference is made to the copending application Serial No. 349,162 of Rhee and Cockburn filed on April 16, 1953, now Patent No. 2,703,436, and entitled "Method of Vulcanizing Rubber Thread Stock" for a more detailed description of a preferred method of using the apparatus of this invention.

The specific and detailed functions of the embodiment illustrated will be more clearly understood from the description which follows.

The autoclave A

The autoclave A, as illustrated in Figure 1 through 4, is horizontally disposed and is suitably supported on members 1, the lower surfaces of which rest on a suitable supporting floor, and the upper surfaces of which engage the lower portion of the outer cylindrical casing 2 of the autoclave.

As illustrated in Figures 1 and 4, a suitable disc-shaped door 3 is provided to close the open end 4 of the autoclave A after the carriage B with the rubber load, has been properly positioned in the autoclave. The opposite end of the autoclave A is closed by an integral domed head 5.

The open end 4 of the autoclave A which may be closed by the disc-shaped door 3 is provided with inwardly projecting teeth 6 spaced around the periphery of the open end 4 which cooperate with similar teeth 7 formed on the periphery of the disc-shaped door 3. This construction permits the outer flange teeth 7 of the door 3 to be moved inwardly past the teeth 6 into the groove in the open end 4 of the autoclave. After so positioning the door, slight rotational movement of the door 3 on its supporting axle 8 will result in the teeth 6 on the autoclave interengaging with the teeth 7 on the door to retain the door on the end 4 of the autoclave and thus enable the interior of the autoclave to be subjected to pressure during the vulcanizing operation.

It has been found desirable to provide an atmosphere of $CO_2$ under pressure within the autoclave during the vulcanizing operation to reduce the possibility of arcing between the electrodes of the high frequency dielectric heating means and to preclude blow holes and other defects from developing on the rubber during the vulcanizing process. A suitable pipe 9, connected to the top of the autoclave A, is provided for this purpose.

There is also provided a high tension housing 10 at the top of the autoclave A. A flange 11 on housing 10 is secured by suitable bolts 12 to the flange 13 of the connecting conduit 14. The rim of a porcelain dished insulator 15 is bolted between the flanges 11 and 13 to serve as a centering means for the high frequency conductor within conduit 14 extending radially from the autoclave casing 2. The high tension housing 10 and the insulator 15 are described in detail hereinafter with the description of the dielectric heating means.

The carriage B

Figure 3:
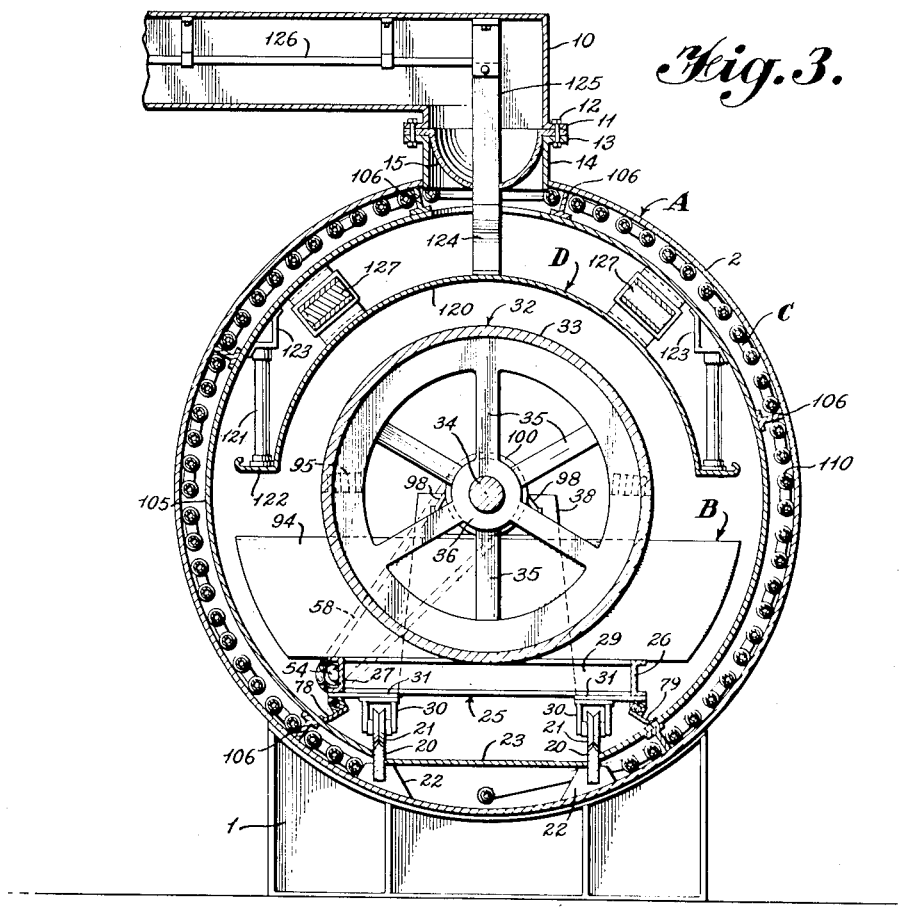
Figure 3 is a transverse sectional view taken on line 3—3 of Figure 1.

As shown most clearly in Figure 3, rails 20, to cooperate with the grooved wheels 21 on the load-supporting carriage B are appropriately provided inside the bottom of the outer casing 2 of the autoclave A. Rails 20 may suitably be welded to supports 22, which in turn are secured, as by welding, to the inner surface of the casing 2. The rails 20 extend parallel to each other and longitudinally of the casing 2 of the autoclave A. A plate 23 is connected between the rails 20 and likewise is secured on the supports 22. The plate 23 separates the interior of the autoclave wherein the rubber load is positioned from an annular space in which the steam heating means C is positioned, as will be described in detail later.

The load-supporting carriage B, illustrated in the embodiment shown in Figures 1 through 4, comprises a channel iron frame indicated generally at 25, made up of side members 26 and 27 and end members 28 and 29. To the bottom of this frame there are secured four grooved wheels 21 which are suitably journaled in bearing supports 30 rigidly secured to the under side of the frame, as by plates 31. These wheels 21 are spaced on the frame 25 so as to cooperate with the rails 20, thus enabling the carriage B to be rolled into the autoclave on rails 20 for the vulcanization of the rubber carried by the carriage.

The carriage B rotatably supports a cylinder 32 on which the sheet rubber to be vulcanized is wound and which serves as an electrode of the dielectric heating means as will be explained hereinafter. This cylinder 32 has an outer cylindrical wall 33 supported on a center axle 34 by a plurality of radially extending braces 35 which join the outer cylindrical wall 33 with the hub 36 on the center axle 34. The radial braces 35 which support the wall 33 on the center axle 34 radiate at equal angles from the hub 36. To secure the desired uniform heating of the rubber load by the dielectric heating means D, the uniform spacing of the braces 35 has been found to be important. These braces radiate in the plane of each of the ends of cylinder 32 and also in planes spaced equidistant along the length of the cylinder. Three radial braces, 120° apart, extend from the hub 36 to the wall 33 in each transverse plane of a set of braces while the three braces of the adjacent set radiate at 120° angles spaced 60° from the adjacent set. Thus, although in Figures 2 and 3 it appears that the braces 35 radiate at 60° angles, actually three braces extend 120° apart in one plane while an adjacent set of braces likewise extend 120° apart in another transverse plane but spaced 60° from the radii of the adjacent set of three braces.

Axle 34 is supported at the opposite ends of the carriage by support plates 37 and 38 respectively. Each of the plates 37 and 38 has a semi-circular saddle at the upper end thereof. Bearings 39 and 40 are positioned in the respective semi-circular saddles and the opposite ends of the axle 34 are journaled in the bearings. These support plates 37 and 38 are vertically mounted on the channel frame 25 of the carriage by plates 41 and 42 in the case of support plate 37 and plates 43 and 44 in the case of support plate 38. To provide additional support for the plates 42 and 44, buttressing brace members 45 and 46, respectively, are secured to the carriage frame and to the respective plates 42 and 44.

Thus it will be seen that the cylinder 32 is supported at the opposite ends thereof for rotation on the carriage B. Rotation of the cylinder 32 helps to secure uniform heating and vulcanization of the sheet rubber applied around the cylinder 32.

Suitable drive means may be provided to the end that the aforementioned rotation may be effected. To accomplish this rotation, the opposite ends of the axle 34 outwardly of the bearings 39 and 40 are squared, as shown at 50. Driving sprockets 51 and 52 are provided at the opposite squared ends, respectively, of the axle 34. Each of the sprockets 51 and 52 has a squared center aperture to cooperate with the squared ends 50 of the axle.

Stub shafts 53 and 54 are journaled in suitable bearing means secured to the side member 27 at the lower side of the channel frame 25 of the carriage B. The stub shafts 53 and 54 support on the outer ends thereof sprockets 55 and 56. A driving chain 57 extends between and around the sprocket 51 and sprocket 55. A similar driving chain 58 extends between and around the sprocket 52 and sprocket 56.

A suitable driving motor 60 is positioned externally of the casing of the autoclave A adjacent the domed head 5, as shown in Figures 1 and 4. The shaft of this motor is coupled by a suitable flanged coupling 61 to a driving shaft 62 extending through the domed head 5 of the autoclave in axial alignment with the stub shaft 54. A flanged bearing and seal 63 is provided in the domed head 5 to rotatably support the shaft 62 and seal the shaft against leakage of the pressurized atmosphere within the autoclave to the surrounding atmosphere. At the inner end of the shaft 62 a bearing 64 is provided, mounted in a transverse wall 65. This transverse wall is pertinent to the operation of the steam heating means, as will be described in detail hereinafter.

As shown most clearly in Figures 5 and 6, the bearing 64 for the inner end of shaft 62 is suitably welded or bolted to the transverse wall 65. Shaft 62 is provided with an enlarged end 66 which extends into the opening of the bearing 64 and is provided with a flange 67 which engages the edge of the opening in the bearing 64. The portion of the enlarged end 66 extending toward the space in the autoclave occupied by the load-supporting carriage B is provided with driving lugs 68 integral therewith. On the outer end of stub shaft 54 to which sprocket 56 is secured for rotation, a notched flange 69 is provided to cooperate with the driving lugs 68 integral with the enlarged end 66 on shaft 62.

From the structure described above, it will be seen that rotation of the shaft of the motor 60 will transmit through coupling 61, shaft 62, driving lugs 68, flange 69, shaft 54, sprocket 56, drive chain 58, and drive sprocket 52, a rotative force to turn the cylinder 32 on the carriage B when such carriage is properly positioned in the autoclave. In operation, the carriage B is rolled into the autoclave A on the parallel rails 20 until the flange 69 properly engages with driving lugs 68. Then energization of the driving motor 60 will rotate the cylinder 32 on the autoclave carriage. It will be understood that the particular driving means herein described is illustrative merely. Any suitable driving means may be used whereby the cylinder 32 on the carriage B may be rotated.

It will be noted that identical driving sprockets, chains and sprockets have been provided at opposite ends of the autoclave carriage. It has been discovered that when a dielectric heating means is used in the vulcanization of rubber, it is important that the carriage be provided with balanced or equal mass distribution to secure uniform dielectric heating. Accordingly, the driving sprockets, chains and sprockets are provided at both ends of the autoclave carriage as a simple expedient in securing balanced mass distribution. This prevents unequal dielectric heating which might be caused by providing the metallic mass of a driving means at only one end of the autoclave carriage.

In the specific embodiment of the invention illustrated on the drawings, it will be noted that the autoclave carriage supports, as an element thereof, one of the electrodes used in the dielectric heating of the rubber sheet carried by the carriage. This electrode consists of cylinder 32 together with its related parts. Thus, cylinder 32 is the lower electrode of the dielectric heating means and is positioned on the carriage B with the outer surface spaced from the upper electrode mounted in the autoclave as will be described hereinafter.

Since the cylinder 32 on the carriage B is to serve as one of the electrodes for the dielectric heating means D, means must be provided to couple this electrode with the source of high frequency power used in the dielectric heating means. To this end, a pair of grounding flaps 78 and 79 are secured along the opposite sides of the carriage B. These grounding flaps are mounted on the carriage so as to be movable outwardly into contact with the structure of the autoclave A when the carriage is properly positioned within the autoclave for vulcanization of the rubber load.

Each of the grounding flaps 78 and 79 is constructed of a length substantially equal to the length of the carriage B with the opposite ends thereof pivotally mounted in supporting journals 80 secured to the underside of plates 31 which mount the bearing supports 30 for grooved wheels 21. These supporting journals 80 at the ends of the grounding flaps 78 and 79 permit the flaps to be pivoted upwardly away from the autoclave structure during insertion into and removal of the carriage B from the autoclave A. Once the carriage B is properly positioned within the autoclave, the flaps 78 and 79 are pivoted downwardly to firmly contact the autoclave structure and thereby connect the carriage to be at the same potential as the autoclave A.

Also, since cylinder 32 acts as one electrode in the dielectric heating means of this invention, it is important to maintain the cylinder 32 and its associated parts electrically connected to the rest of the carriage so as to be at the same electrical potential as the other parts of the carriage. To accomplish this, brushes are provided at the opposite ends of the carriage B to ground the rotating members to the carriage and thence through the grounding flaps 78 and 79 to the autoclave structure.

In connecting the outer cylindrical wall 33 of the cylinder 32 to ground, a plurality of brushes 95 are mounted on the transverse plates 93 and 94 by suitable plates 96. Brush holding plates 96 are secured to the transverse plates 93 or 94 by nut and bolt connectors 97. As best shown in Figure 4, it will be noted that four sets of brushes 95 are positioned to engage the ends of the wall 33 of cylinder 32, two of these sets of brushes being positioned at each end of the cylinder and engaging diametrically opposite points on the peripheral edge of the wall 33.

In addition to the grounding brushes 95 for the outer wall 33 of the cylinder 32, two additional sets of grounding brushes 98 are provided for the center axle 34 of cylinder 32. Brushes 98 are positioned to engage drums 99 and 100 mounted on the ends of the axle 34. The brushes 98 engaging the outer surfaces of drums 99 and 100 are mounted on the transverse plates 93 and 94 by horizontal plates 101 and 102 secured to the transverse plates 93 and 94, respectively.

From the above described structure it will be apparent that the brushes 95 and 98 serve to ground the rotatable cylinder 32 and its axle 34 to the autoclave carriage. Further, the grounding flaps 78 and 79 provide a means for connecting the rotatable cylinder 32 to ground potential by contacting the autoclave structure when the carriage has been properly positioned for vulcanization of the rubber load in the autoclave.

It is further pointed out that these grounding flaps 78 and 79, by extending throughout the entire length of the autoclave carriage, provide an efficient ground for the entire carriage structure and thereby insure that the cylinder 32 will be maintained at ground potential to act as one of the electrodes in the dielectric heating means D.

The steam heating means C

A separating partition 105 extends concentric to the casing 2 of the autoclave A. Partition 105 extends parallel to the casing 2 from one side of one rail 20 around the interior of the autoclave to the side of the opposite rail 20. The positioning of this partition in the autoclave provides an annular space between casing 2 and partition 105 for steam heating coils 110 of the steam heating means C. The dividing plate 23 extending between the parallel rails 20 completes this annular space which extends throughout a major portion of the length of the autoclave. The partition 105 is suitably secured in spaced relation to the casing 2 by spacing members 106. Spacing members 106 are welded to the interior of casing 2 and the exterior of the separating partition 105. The end of partition 105 is secured to the transverse wall 65 toward the rear of the autoclave by angle members 107 and rivets 108 connecting the legs of the angle members to the respective abutting edges of partition 105 and transverse wall 65.

Figure 2:
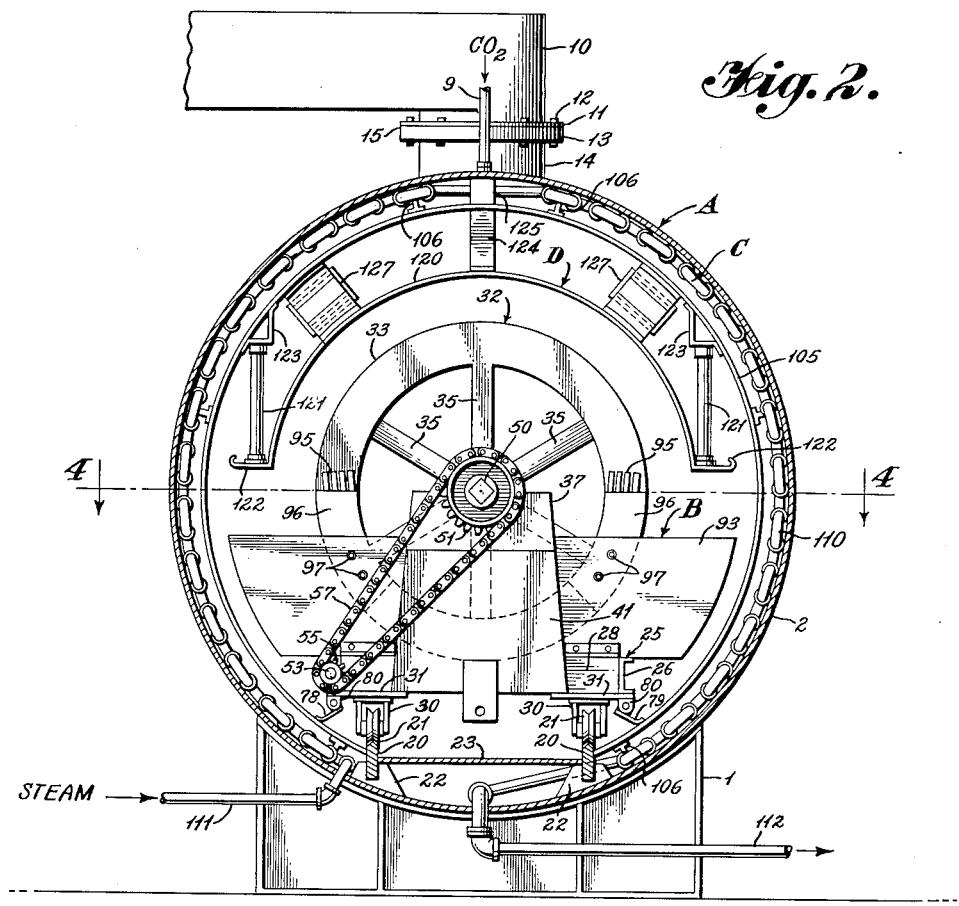
Figure 2 is a transverse sectional view taken on line 2—2 of Figure 1.

In vulcanizing rubber with the herein disclosed apparatus, the atmosphere within the autoclave surrounding the sheet rubber supported on cylinder 32 is suitably raised to the vulcanizing temperature by steam coils 110 positioned in the annular space between the separating partition 105 and casing 2, as shown specifically in Figure 2. A steam inlet pipe 111 is connected to one end of the coils 110 and a steam or condensate drain 112 connected to the opposite end of the coils, so that steam may be applied to the heating coils to obtain the desired temperature of the atmosphere within the autoclave.

The coils 110 are made up of a plurality of lengths of conduit extending longitudinally within the annular space, with the ends of adjacent conduits being connected by U couplings. Thus the steam in entering through pipe 111 passes back and forth within the conduits to heat the atmosphere within the annular space between the separating partition 105 and casing 2, until the steam condenses or is bled off through the outlet 112.

An opening, shown best in Figure 1, is provided in the transverse wall 65 for circulation of the atmosphere within the autoclave to facilitate uniform heating thereof by steam heating means C. This opening, as shown in the drawings, is provided with flow-directing louvers 115 to provide a more uniform flow of heated gases across the rubber to be vulcanized on the carriage.

To secure forced circulation of the gases within the autoclave, a fan 116 having a suitable electric motor 117, is mounted on a supporting bracket 118 secured as by bolts or rivets 119 to the transverse wall 65. This fan 116 is positioned to direct the flow of heated gases through the louvers 115 across the rubber supported on the cylinder 32 of the carriage B. A forced circulation of gases is thereby produced to effect uniform temperature conditions within the autoclave.

The high frequency dielectric heating means D

High frequency dielectric heating of a dielectric material such as rubber is accomplished by disposing the dielectric material between electrodes and thereafter applying a high frequency voltage across the two electrodes. The application of the high frequency to the electrodes sets up an electrostatic field between the electrodes which develops heat within this material.

The cylinder 32 and associated parts which, in the apparatus shown in the drawings, forms part of the carriage B, serves as the grounded or cold electrode of the dielectric heating means utilized in the apparatus of this invention. Positioned within the autoclave A, above and opposite the cylinder, there is provided an electrode 120. This electrode serves as the hot or high tension electrode for the dielectric heating means. As shown in the embodiment illustrated, this electrode 120 is rigidly supported within the autoclave by insulating rods 121 secured to the flanges 122 of the upper electrode 120. The upper ends of these insulating rods 121 are secured to brackets 123 mounted on the inner surface of the separating sheet 105. Thus the electrode 120 is positioned to extend parallel to and concentric with the surface of the cylinder 32 when the autoclave carriage is positioned for vulcanization of the rubber load.

To apply the high frequency voltage to the cooperating electrodes the midpoint of the electrode 120 is engaged by conductors 124 connected to the lower end of a conductor bar 125. The conductor bar extends outwardly through conduit 14 and dished insulator 15 to housing 10 where it connects with high frequency lead-in wire 126. Within the housing 10 and insulated therefrom the high frequency lead-in wire 126 extends to a suitable high frequency generator or oscillator (not shown).

The return or high frequency ground for the apparatus is suitably provided by the conduit 14 and housing 10 so that the high frequency voltage is applied across the opposite electrodes 120 and cylinder 32 to produce the high frequency dielectric heating of the dielectric material supported on the cylinder 32.

To enable the dielectric heating means D to be tuned with respect to resonance with the frequency of the voltage of the high frequency generator, suitable tuning stubs 127 are interposed between the electrode 120 and the separating sheet 105. Tuning stubs 127 are preferably adjusted to the load and set when the apparatus is initially constructed, so that the heating means will be properly tuned for the frequency of the voltage of the generator.

Positioning of sheet rubber for vulcanization

Figure 7:
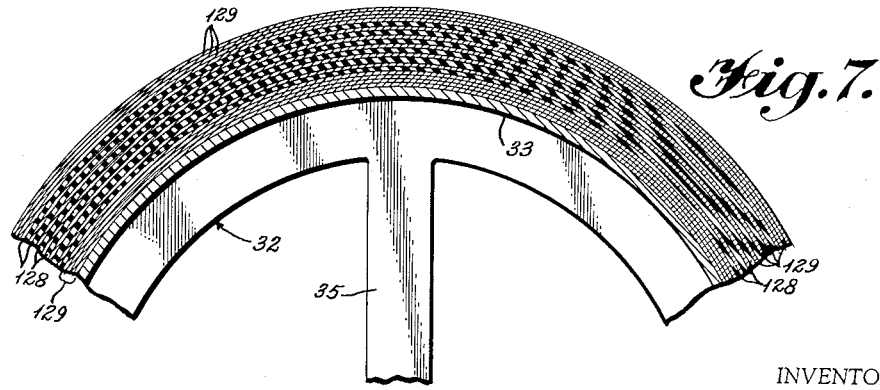
Figure 7 is a sectional view of a portion of the end of the rubber supporting cylinder with the load to be vulcanized positioned thereon.
Figure 8:
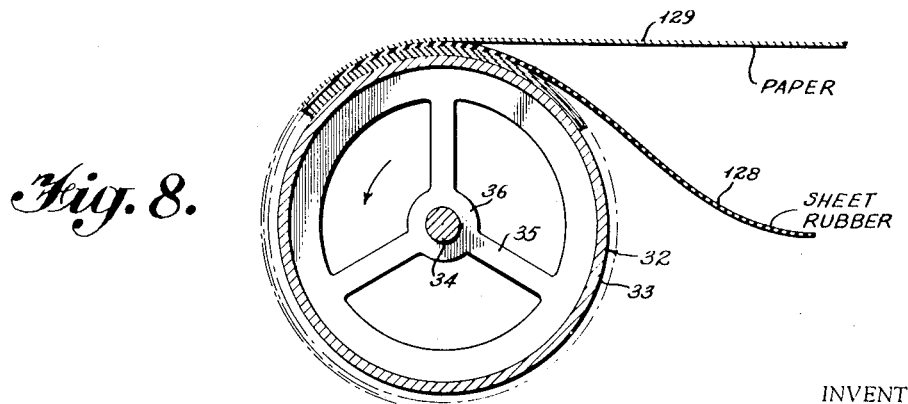
Figure 8 is a transverse sectional view of the rubber supporting cylinder illustrating the manner in which the rubber load to be vulcanized and the sheet dielectric material are applied to the supporting cylinder.

Referring specifically to Figures 7 and 8, there is shown the arrangement utilized in wrapping the rubber to be vulcanized on the cylinder 32. Figure 7 shows the calendered rubber sheet 128 wrapped around the cylinder 32 with a plurality of turns of paper 129, preferably glassine paper, initially wrapped around the cylinder 32 and then the rubber sheet and paper interleaved and wrapped to the desired thickness of rubber sheet to be vulcanized. After sufficient rubber has been applied, interleaved with paper, to the cylinder 32, several additional layers of paper are wrapped around the outside of the mass to complete the rubber load to be vulcanized. Figure 8 illustrates the manner in which this paper and sheet rubber are interleaved and rolled on to the cylinder 32.

At the high temperatures needed to vulcanize sheet rubber, the rubber would sag away from the cylinder 32 were not some support provided to retain the calendered rubber sheet in position. The glassine paper as it is wrapped around the cylinder 32 is tensioned, as shown in Figure 8, to provide the necessary support for the calendered rubber sheet while the sheet rubber is fed into the cylinder 32 slack. The tensioned feeding of the paper thus assists in correcting and removing the calendering defects such as rough surfaces and friction holes from the sheet rubber during the vulcanization thereof by acting as a low pressure press on the calendered sheet rubber.

Operation

The carriage B initially has applied thereto the calendered sheet rubber which is to be vulcanized. As shown in Figure 8, the cylinder 32 on the carriage is rotated to wind thereon several initial layers of the glassine paper. After these base layers have been applied, the sheet rubber is wound on to the cylinder 32 by further rotation thereof. This sheet rubber is applied together with the paper so that the resulting load to be vulcanized has a cross-section of alternate layers of rubber and paper.

Once the cylinder 32 has been loaded with the desired length or quantity of calendered sheet rubber, the sheet is cut off and several additional layers of glassine paper are wound around the cylinder by further rotation thereof. The end of the outer wind of paper is then sealed to the roll by an adhesive tape such as cellophane tape having a pressure sensitive adhesive. The final load ready to be moved on to the autoclave for vulcanization has a cross-section, as shown in Figure 7, which illustrates the layers of paper, the alternate layers of rubber and paper, and the outer final layers of paper alone.

After loading the cylinder 32 as described, the carriage B is wheeled to the open mouth of the autoclave A and rolled into the autoclave on the parallel rails 20. To obtain uniform vulcanization of the sheet rubber, the cylinder 32 with the load thereon is rotated during the vulcanization process. In the apparatus disclosed, the motor 60, external of the autoclave casing 2, provides the necessary power for rotating the cylinder. The carriage B is rolled completely into the autoclave as far back therein as possible so that the driven flange 69 will engage the driving lugs 68. These lugs 68 are operatively connected with the shaft of motor 60. Thus, by energizing the motor 60, the cylinder 32 is rotated through sprocket 56, chain 58 and driving sprocket 52 to transmit power from the flange 69 to the cylinder 32.

When the carriage B is fully inserted into the autoclave A, the cylinder 32 is disposed directly below the electrode 120 of the dielectric heating means D. The door 3 of the autoclave A is closed and secured and $CO_2$ is applied to the interior of the autoclave under pressure through pipe 9. Providing an atmosphere of $CO_2$ within the autoclave reduces the possibility of having an undesirable arc between the electrodes and further helps to prevent the formation of blow holes in the rubber being vulcanized.

The apparatus is now in readiness for application of the vulcanizing heat. A high frequency current is supplied to the electrode 120 and electrode cylinder 32 to set up an electrostatic field between these electrodes, and the rubber and paper load positioned between these electrodes is subjected to this field to effect internal heating of the rubber and paper.

At the same time that the rubber is being internally heated by the dielectric heating means D, steam is applied through pipe 111 to the coils 110 in the annular space between the casing 2 and separating partition 105. The fan 116 is then put in operation to circulate the atmosphere within the autoclave over the coils 110 and then across the load positioned on the carriage B. Thus the atmospheric temperature is raised toward the vulcanizing temperature while the rubber is being internally heated by the dielectric heating means.

To obtain the uniformity of heat within the rubber the motor 60 is energized during this heating stage to slowly rotate the cylinder 32.

As soon as the rubber has been heated to the vulcanizing temperature, and before substantially any vulcanization has taken place, the dielectric heating means D is deenergized and sufficient heat applied to coils 110 to maintain the atmosphere at the vulcanizing temperature. The fan 116 continues to circulate the atmosphere and thus keep the rubber at the proper temperature.

When the rubber has been maintained at the vulcanization temperature for the necessary length of time, the steam heating means C and the circulating fan are cut off, the autoclave is depressurized, the door 3 opened and the rubber carriage B removed from the autoclave to permit cooling of the rubber which has been vulcanized.

In the utilization of the apparatus of this invention it is extremely important that the high frequency dielectric heating means D be used only to raise the rubber to the vulcanization point. Further use of the dielectric heating means beyond this point would result in overheating and therefore burning of the sheet rubber, a condition which obviously is undesirable and would require discarding portions of the rubber that had become discolored. Therefore, when the dielectric heating means D is cut off, the steam heating means C must be utilized by itself to control the temperature of the atmosphere within the autoclave so as to maintain the rubber at the particular vulcanization temperature for the required length of time.

What is claimed is:

1. A rubber vulcanizing apparatus comprising an autoclave having a door to provide access to the interior of the autoclave, a partition positioned inside said autoclave to divide the interior space into a load receiving space and an outer space, heating means disposed in said outer space, an electrode insulated from said autoclave, a carriage movable into and out of the load receiving space of said autoclave, a cylinder mounted longitudinally of and grounded to said carriage for supporting a quantity of sheet rubber to be vulcanized on said carriage, a pair of flaps adjustably mounted along opposite sides of said carriage to be moved into engagement with the autoclave structure to ground said carriage when the carriage is positioned in said autoclave, and means for connecting said electrode and said cylinder to the output of a high-frequency generator whereby a high-frequency electric field will be produced between said electrode and said cylinder.

2. An apparatus as recited in claim 1 wherein said grounding flaps are mounted on a pivotal rod and extend along substantially the entire length of said carriage.

3. A carriage for supporting sheet rubber while it is being vulcanized in an autoclave by combined high-frequency dielectric heating means and steam heating means having a sheet rubber supporting cylinder rotatably supported at the opposite ends thereof on said carriage, a pair of flaps pivotally mounted along the sides of said carriage so as to be movable into and out of engagement with the wall of an autoclave when the carriage is positioned therein, and means for detachably coupling said cylinder to a driving means whereby said cylinder may be rotated when the carriage is positioned in an autoclave.

4. A carriage as recited in claim 3 further characterized by having grounding brushes mounted on said carriage to engage said rotatable cylinder and thereby ground said cylinder to said carriage.

5. A rubber vulcanizing apparatus comprising an autoclave closed at one end and having a door at the opposite end thereof to provide access to the autoclave interior, a partition mounted within said autoclave to divide the interior into a load receiving space and an outer space, heating means disposed in said outer space, a carriage movable into and out of the load receiving space of said autoclave, a sheet rubber supporting cylinder mounted longitudinally of and grounded to said carriage, a semi-cylindrical electrode mounted within and insulated from said autoclave with said electrode being generally concentric to the rubber supporting cylinder when said carriage is positioned within said autoclave, grounding flap means extending along the length of said carriage and said autoclave when said carriage is positioned within said autoclave and selectively engageable between said carriage and said autoclave to ground said carriage along substantially its entire length to said autoclave, and means for connecting said electrode and said autoclave to a high-frequency generator whereby a high-frequency electric field will be produced between said electrode and said cylinder.

6. An apparatus as recited in claim 5 further characterized by having grounding brushes supported on said carriage and engaging the cylinder for supporting the sheet rubber to be vulcanized so that said cylinder is grounded to said carriage.

7. A rubber vulcanizing apparatus comprising an autoclave closed at one end and having a door at the opposite end thereof to provide access to the autoclave interior, a partition mounted within said autoclave to divide the interior into a load receiving space and an outer space with said outer space communicating with said load receiving space adjacent the ends of said autoclave, heating means disposed in said outer space, fan means mounted centrally of said one end of said autoclave to circulate the atmosphere over said heating means and force it across the surface of the rubber being vulcanized in said autoclave, a pair of parallel rails secured adjacent the bottom of said autoclave, a carriage having wheels engageable with said rails to guide movement of said carriage into and out of the load receiving space of said autoclave, a sheet rubber supporting cylinder rotatably mounted longitudinally of and grounded to said carriage, a semi-cylindrical electrode mounted within and insulated from said autoclave with said electrode being generally concentric to the rubber supporting cylinder when said carriage is positioned on said rails within said autoclave, grounding flap means extending along the length of said carriage and said autoclave when said carriage is positioned within said autoclave and selectively engageable between said carriage and said autoclave to ground said carriage along substantially its entire length to said autoclave, and means for connecting said electrode and said autoclave to a high-frequency generator whereby a high-frequency electric field will be produced between said electrode and said cylinder.

References Cited in the file of this patent

UNITED STATES PATENTS

| | | |
|---|---|---|
| 1,543,890 | Williams | June 30, 1925 |
| 2,129,203 | Dufour et al. | Sept. 6, 1938 |
| 2,408,434 | Mann et al. | Oct. 1, 1946 |
| 2,438,952 | Te Grotenhuis | Apr. 6, 1948 |
| 2,439,011 | Larkin et al. | Apr. 6, 1948 |
| 2,445,701 | Vogt | July 20, 1948 |
| 2,472,193 | Clayton | June 7, 1949 |
| 2,543,315 | Fabregat | Feb. 27, 1951 |